United States Patent
Hayashi

(10) Patent No.: US 10,482,213 B2
(45) Date of Patent: Nov. 19, 2019

(54) CIRCUIT DESIGN SUPPORT APPARATUS AND CIRCUIT DESIGN SUPPORT METHOD

(71) Applicants: KABUSHIKI KAISHA TOSHIBA, Minato-ku (JP); Toshiba Electronic Devices & Storage Corporation, Minato-ku (JP)

(72) Inventor: Sachio Hayashi, Kawasaki (JP)

(73) Assignees: KABUSHIKI KAISHA TOSHIBA, Minato-ku (JP); Toshiba Electronic Devices & Storage Corporation, Minato-ku (JP)

( * ) Notice: Subject to any disclaimer, the term of this patent is extended or adjusted under 35 U.S.C. 154(b) by 0 days.

(21) Appl. No.: 16/122,322

(22) Filed: Sep. 5, 2018

(65) Prior Publication Data

US 2019/0294752 A1    Sep. 26, 2019

(30) Foreign Application Priority Data

Mar. 20, 2018 (JP) .................................. 2018-052470

(51) Int. Cl.
*G06F 17/50* (2006.01)

(52) U.S. Cl.
CPC ...... *G06F 17/5081* (2013.01); *G06F 2217/82* (2013.01)

(58) Field of Classification Search
CPC .......................... G06F 17/5081; G06F 2217/82
USPC ........................................................ 716/115
See application file for complete search history.

(56) References Cited

U.S. PATENT DOCUMENTS

| | | | | |
|---|---|---|---|---|
| 5,568,395 A * | 10/1996 | Huang | ................ | G06F 17/5036 703/13 |
| 6,128,769 A * | 10/2000 | Carlson | ............... | G06F 17/5022 703/19 |
| 6,493,853 B1 * | 12/2002 | Savithri | ............. | G06F 17/5036 716/115 |
| 6,665,845 B1 * | 12/2003 | Aingaran | ............ | G06F 17/5036 716/113 |
| 2007/0006109 A1 * | 1/2007 | Bartling | ................ | G06F 17/505 716/113 |
| 2007/0143719 A1 * | 6/2007 | Chopra | ............... | G06F 17/5036 716/113 |

(Continued)

FOREIGN PATENT DOCUMENTS

| | | |
|---|---|---|
| JP | 11-203346 | 7/1999 |
| JP | 3971105 | 9/2007 |

(Continued)

*Primary Examiner* — Suresh Memula
(74) *Attorney, Agent, or Firm* — Oblon, McClelland, Maier & Neustadt, L.L.P.

(57) ABSTRACT

According to one embodiment, a circuit design support apparatus includes: a first specifying unit that specifies a first element generating negative potential; a second specifying unit that specifies a criterion of a current flowing to a substrate from an electrode of a second element arranged in a peripheral area of the first element due to a parasitic element; a calculation unit that calculates a criterion violation rate under a condition where a location of the second element has been shifted to one of a plurality of places; and a display processing unit that displays, on a display, information indicating the criterion violation rate such that the information is superimposed on a layout.

10 Claims, 3 Drawing Sheets

(56) References Cited

U.S. PATENT DOCUMENTS

2010/0218152 A1* 8/2010 Tehrani ............... G06F 17/5022
716/113
2017/0177781 A1* 6/2017 Rose ................... G06F 17/5077

FOREIGN PATENT DOCUMENTS

| JP | 2015-26296 | 2/2015 |
| JP | 5920042 | 5/2016 |

* cited by examiner

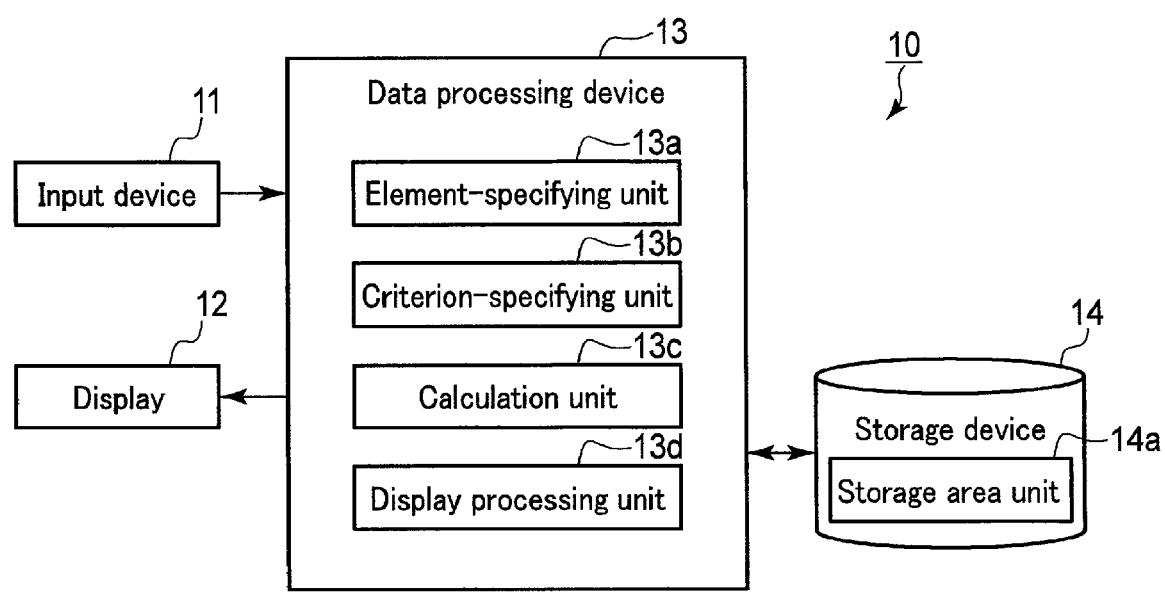
F I G. 1

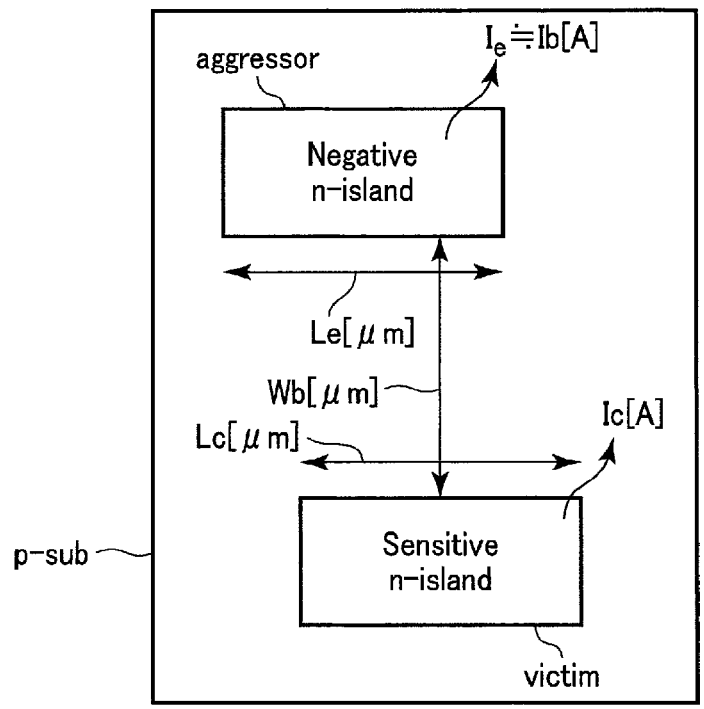
F I G. 2
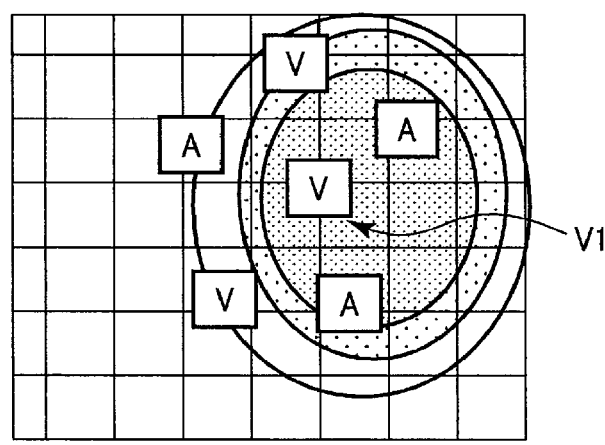
F I G. 3

CIRCUIT DESIGN SUPPORT APPARATUS AND CIRCUIT DESIGN SUPPORT METHOD

CROSS-REFERENCE TO RELATED APPLICATIONS

This application is based upon and claims the benefit of priority from Japanese Patent Application No. 2018-052470, filed Mar. 20, 2018, the entire contents of which are incorporated herein by reference.

FIELD

Embodiments described herein relate generally to a circuit design support apparatus and a circuit design support method.

BACKGROUND

In a semiconductor integrated circuit (LSI: large scale integrated circuit), elements are electrically separated from each other when a p-n junction formed between a semiconductor substrate and semiconductor elements is inversely biased. However, if the p-n junction is forward-biased, and a current passes through the p-n junction, a parasitic bipolar transistor including the p-n junction operates, and a propagation path of noise is formed, thereby causing the elements to malfunction.

In regard to this, there is a technique of performing a circuit simulation based on a netlist of the LSI and thereby extracting a negative potential node that generates a negative potential level which is lower than ground potential in the netlist. In this technique, whether or not a netlist including a parasitic bipolar transistor meets predetermined signal specifications is determined based on the negative potential node by performing the circuit simulation when the parasitic bipolar transistor is added to the netlist.

BRIEF DESCRIPTION OF THE DRAWINGS

FIG. 1 is a block diagram showing a configuration of a circuit design support apparatus according to an embodiment;

FIG. 2 is a diagram illustrating an example of the dimensions of an aggressor element and a victim element that are related to a calculation unit of a data processing device of the circuit design support apparatus according to the embodiment;

FIG. 3 is a diagram showing an example of a map display of a criterion violation rate which is displayed by a display processing unit of the data processing device of the circuit design support apparatus according to the embodiment.

DETAILED DESCRIPTION

Figure 4:
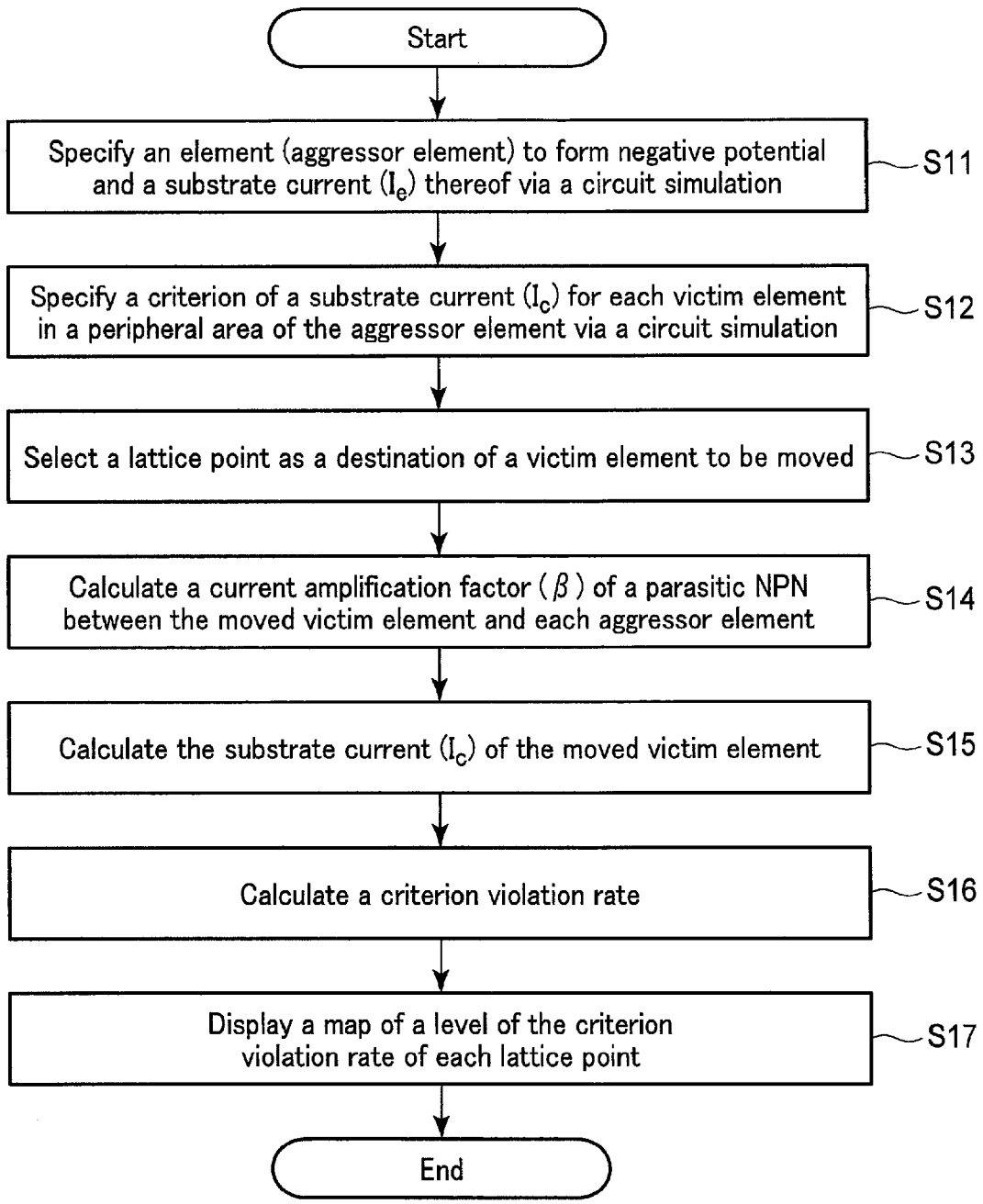
FIG. 4 is a flowchart showing an example of a processing operation of the data processing device of the circuit design support apparatus according to the embodiment.

In general, according to one embodiment, there is provided a circuit design support apparatus including: a first specifying unit that specifies at least one first element by a circuit simulation, the first element being arranged on a substrate and being configured to generate negative potential lower than ground potential. In general, according to one embodiment, a circuit design support apparatus includes a second specifying unit that specifies, by a circuit simulation, an amount of current of a noise current source that prevents at least one second element from meeting signal specifications, the second element being arranged in a peripheral area of the first element on the substrate, the amount of current of the noise current source being specified as a criterion of a current flowing from an electrode of the second element to the substrate due to a parasitic element formed between the first element and the second element, and the noise current source being connected to the electrode of the second element. In general, according to one embodiment, a circuit design support apparatus includes a calculation unit that under a condition where a location of the second element has been shifted to one of a plurality of places, calculates a second element current flowing to the substrate from the electrode of the second element whose location has been shifted, and calculates a criterion violation rate for each of the plurality of places, the criterion violation rate being represented by a percentage of a difference between the criterion specified for the second element whose location has been shifted and the calculated second element current in relation to the criterion. In general, according to one embodiment, a circuit design support apparatus includes a display processing unit that displays, on a display, information indicating the calculated criterion violation rate such that the information is superimposed on a layout showing a positional relationship between the first element and the second element whose location has been shifted.

Hereinafter, embodiments will be described with reference to the drawings.

FIG. 1 is a block diagram showing a configuration of a circuit design support apparatus according to an embodiment.

A circuit design support apparatus 10 is a computer that supports a circuit design of a semiconductor device made of a semiconductor substrate and a semiconductor element, for example, MOSFET (field-effect transistor) formed on the semiconductor substrate. The circuit design support apparatus 10 is formed of an input-output device, a storage device, a CPU (central processing unit), etc. The type of the CPU is not limited, so long as it is a processor.

Specifically, the circuit design support apparatus 10 includes: an input device 11 (such as a keyboard); a display 12 (such as a monitor) with a screen which, for example, displays various data; and a CPU. The circuit design support apparatus 10 also includes a data processing device 13 which executes various types of processing, and a storage device 14 which stores various data.

The input device 11 receives an input operation (for example, an operation related to a circuit simulation) from a user as a circuit designer.

The data processing device 13 includes an element-specifying unit 13a, a criterion-specifying unit 13b, a calculation unit 13c, and a display processing unit 13d.

The storage device 14 can be realized by a non-volatile memory, etc. The storage device 14 includes a storage area unit 14a for storing various data. Each of the units in the data processing device 13 may be implemented mainly by the CPU executing a software (firmware), or by a hardware. For example, the CPU controls the processing performed by each of the units in the data processing device 13.

(Element-Specifying Unit 13a of Data Processing Device 13)

The element-specifying unit 13a of the data processing device 13 reads, from the storage area unit 14a of the storage device 14, a netlist describing an original circuit of a semiconductor integrated circuit, and a testbench describing simulation conditions, etc.

The element-specifying unit 13a uses the read netlist and testbench to perform a circuit simulation according to an operation performed on the input device 11.

Thereby, the element-specifying unit 13a specifies, in the netlist, a minimum of one aggressor element which is arranged on a P-type semiconductor substrate of a semiconductor device, and a level of potential generated which is a negative potential level lower than ground potential.

Also, the element-specifying unit 13a specifies, in the netlist, a current $I_e$ flowing from the P-type semiconductor substrate to an electrode (e.g. drain terminal) of the aggressor element via, for example, an epitaxial layer or an embedded layer of an N-type semiconductor.

(Criterion-Specifying Unit 13b of Data Processing Device 13)

An element which is at least one element arranged in a peripheral area of the specified aggressor element in the P-type semiconductor substrate, and becomes unable to meet predetermined signal specifications due to an influence by the aggressor element, is called a "victim element." The criterion-specifying unit 13b of the data processing device 13 specifies a criterion $I_{c\text{-}crite}$ of a current $I_c$ flowing from an electrode (e.g. drain terminal) of the victim element to the P-type semiconductor substrate via, for example, an embedded layer or an epitaxial layer of the N-type semiconductor, by connecting a noise current source to the electrode of the victim element and performing a circuit simulation. The criterion refers to an amount of current of the noise current source that prevents the victim element from meeting signal specifications.

The criterion-specifying unit 13b specifies the aforementioned criterion for each of the victim elements arranged in a peripheral area of the specified aggressor element.

(Calculation Unit 13c of Data Processing Device 13)

The calculation unit 13c of the data processing device 13 selects one of the lattice points which are virtually set on a semiconductor chip where each element is arranged. Under a condition where the victim element to be moved has been virtually moved to the selected lattice point (namely, under a condition where a location of the victim element has been virtually changed), the calculation unit 13c selects one of a plurality of aggressor elements arranged in a peripheral area of the moved victim element. The calculation unit 13c calculates a current amplification factor β due to a parasitic element formed between the selected aggressor element and the moved victim element. In this embodiment, the parasitic element is a parasitic bipolar transistor as an npn-type bipolar transistor.

Also, the calculation unit 13c selects one of the unselected aggressor elements in the plurality of aggressor elements arranged in a peripheral area of the very victim element that has been moved. The calculation unit 13c calculates a current amplification factor β due to a parasitic element formed between the selected aggressor element and the moved victim element. The calculation unit 13c performs the calculation for each of the aggressor elements arranged in a peripheral area of the very victim element that has been moved.

The above-described parasitic bipolar transistor is an element that associates the P-type semiconductor substrate with a base, associates the aggressor element with an emitter, and associates the victim element with a collector.

The current $I_e$ is a current drawn from the P-type semiconductor substrate into an N-island of the aggressor element (embedded layer or epitaxial layer of the N-type semiconductor) by the parasitic bipolar transistor. This current corresponds to an emitter current of the parasitic bipolar transistor.

Also, the current $I_c$ is a current drawn from an N-island of the moved victim element into the P-type semiconductor substrate by the parasitic bipolar transistor. This current corresponds to a collector current of the parasitic bipolar transistor.

FIG. 2 is a diagram illustrating an example of the dimensions of the aggressor element and the victim element that are related to the calculation unit of the data processing device of the circuit design support apparatus according to the embodiment.

The calculation unit 13c computes the current amplification factor β of the parasitic bipolar transistor according to a formula (1), which is a function of a distance Wb, an emitter width Le, and a collector width Lc shown in FIG. 2.

The distance Wb is a distance between the N-island of the aggressor element and the N-island of the moved victim element. The emitter width Le is a length of a portion of the N-island of the aggressor element that is opposed to the N-island of the moved victim element (i.e. a length of a portion facing the N-island of the victim element). The collector width Lc is a length of a portion of the N-island of the moved victim element that is opposed to the N-island of the aggressor element (i.e. a length of a portion facing the N-island of the aggressor element).

A specific function form of the formula (1) can be obtained by acquiring, from TEG (Test Element Group) data, an actual measurement value of β according to a suitable change in Wb, Le, and Lc, and determining a regression equation based on the actual measurement value.

$$\beta = f(Wb, Le, Lc) \qquad \text{Formula (1)}$$

$$I_c = \beta \times I_b \approx \beta \times I_e \qquad \text{Formula (2)}$$

$I_b$ denotes a current applied to the base of the parasitic bipolar transistor. Since the distance Wb is large in the parasitic bipolar transistor, $I_b$ is approximately equal to $I_e$.

Also, the calculation unit 13c selects one of the plurality of aggressor elements arranged in a peripheral area of the moved victim element. The calculation unit 13c calculates a current after amplification according to the formula (2). As represented by the formula (2), the current after amplification is obtained by multiplying the current $I_e$ by the current amplification factor β—the current $I_e$ being a current flowing from the P-type semiconductor substrate to the selected aggressor element, and specified by the element-specifying unit 13a, as described above; the current amplification factor β being a current amplification factor due to the parasitic element formed between the aggressor element and the moved victim element, and calculated as described above.

Also, the calculation unit 13c selects one of the unselected aggressor elements from the plurality of aggressor elements arranged in a peripheral area of the very victim element that has been moved. For the selected aggressor element, the calculation unit 13c calculates a current after amplification according to the formula (2). The calculation unit 13c performs the calculation of the current for each of other aggressor elements in a peripheral area of the very victim element that has been moved.

For the very victim element that has been moved, the calculation unit 13c calculates, as the current $I_c$ flowing from the electrode of the moved victim element to the P-type semiconductor substrate, a total value of the currents after amplification that have been calculated for the respective aggressor elements arranged in a peripheral area of the very victim element described above.

Namely, the calculation unit 13c can calculate the current amplification factor due to the parasitic element formed between the moved victim element and the aggressor element arranged in a peripheral area of the victim element, based on the dimensions between the moved victim element and the aggressor element arranged in a peripheral area of the victim element.

Also, based on the current $I_e$ specified for the aggressor element arranged in a peripheral area of the moved victim element as described above, and on the current amplification factor β by the parasitic element formed between the aggressor element and the moved victim element, the calculation unit 13c can calculate the current $I_c$ flowing from the electrode of the moved victim element to the P-type semiconductor substrate.

According to the formula (3) presented below, the calculation unit 13c also calculates a percentage of a difference between the criterion $I_{c\text{-crite}}$ (specified for the moved victim element as described above) and the current $I_c$ (calculated for the victim element) in relation to the criterion $I_{c\text{-crite}}$. The percentage represents a criterion violation rate of the current $I_c$ under the condition where the victim element has been moved to the selected lattice point as described above—the current $I_c$ flowing from the electrode of the moved victim element to the P-type semiconductor substrate.

$$\text{Criterion violation rate (\%)} = \{(I_c - I_{c\text{-crite}})/I_{c\text{-crite}}\} \times 100 \quad \text{Formula (3)}$$

The calculation unit 13c selects one of the unselected lattice points. The calculation unit 13c calculates the current amplification factor β, current $I_c$, and criterion violation rate described above, under a condition where the victim element has been moved to the selected lattice point (namely, under a condition where the location of the victim element has been shifted). The calculation unit 13c performs the calculation of the current amplification factor β, current $I_c$, and criterion violation rate for each lattice point.

(Display Processing Unit 13d of Data Processing Device 13)

FIG. 3 is a diagram showing an example of a map display of the criterion violation rate displayed by the display processing unit of the data processing device of the circuit design support apparatus according to the embodiment.

As shown in FIG. 3, the display processing unit 13d generates information that indicates, by shading, etc., a level of the criterion violation rate calculated by the calculation unit 13c for each lattice point. The display processing unit 13d generates image information formed by superimposing the generated information on layout information indicating a positional relationship between the aggressor element and the moved victim element V1. The display processing unit 13d displays the generated image information on the display 12.

Referring to the displayed map information, a circuit designer can suitably change a circuit layout by, for example, moving the victim element to a lattice point where the level of the criterion violation rate is low.

FIG. 4 is a flowchart showing an example of a processing operation of the data processing device of the circuit design support apparatus according to the embodiment.

First, the element-specifying unit 13a of the data processing device 13 uses the netlist and testbench stored in the storage area unit 14a of the storage device 14, to perform a circuit simulation. Thereby, the element-specifying unit 13a specifies at least one aggressor element, and the current $I_e$ flowing from the P-type semiconductor substrate to the electrode of the aggressor element (S11).

The criterion-specifying unit 13b specifies, by the circuit simulation, the criterion $I_{c\text{-crite}}$ of the current $I_c$ flowing from the electrode of the victim element to the P-type semiconductor substrate (S12).

The calculation unit 13c selects one of the lattice points set on a semiconductor chip (S13). Under a condition where the victim element to be moved has actually been moved to the selected lattice point, the calculation unit 13c selects one of a plurality of aggressor elements arranged in a peripheral area of the moved victim element.

Based on the formula (1) described above, the calculation unit 13c calculates, for each aggressor element, the current amplification factor β by the parasitic element formed between the selected aggressor element and the moved victim element (S14).

The calculation unit 13c also calculates a current after amplification obtained by multiplying the current $I_e$ specified in S11 by the current amplification factor 13 calculated in S14—the current $I_e$ being a current flowing from the P-type semiconductor substrate to the selected aggressor element; the current amplification factor β being a current amplification factor due to the parasitic element formed between the aggressor element and the moved victim element.

The calculation unit 13c performs the calculation of the current for each of other aggressor elements in a peripheral area of the very victim element that has been moved. The calculation unit 13c calculates a total value of the calculated currents, as the current $I_c$ flowing from the electrode of the moved victim element to the P-type semiconductor substrate (S15).

Based on the formula (3) presented above, the calculation unit 13c also calculates a percentage of a difference between the criterion $I_{c\text{-crite}}$ (specified in S13 for the moved victim element) and the current $I_c$ (calculated in S15 for the victim element) in relation to the criterion $I_{c\text{-crite}}$ (S16). The percentage represents a criterion violation rate of the current $I_c$ under the condition where the victim element has been moved to the selected lattice point as described above—the current $I_c$ flowing from the electrode of the moved victim element to the P-type semiconductor substrate.

The calculation unit 13c selects one of the unselected lattice points. Under the condition where the victim element has been moved to the selected lattice point, the calculation unit 13c calculates the current amplification factor β, current $I_c$, and criterion violation rate corresponding to S14, S15, and S16 described above. The calculation unit 13c performs the calculation of the current amplification factor β, current $I_c$, and criterion violation rate for each lattice point.

The display processing unit 13d generates information that indicates, by shading, etc., a level of the criterion violation rate calculated by the calculation unit 13c in S16 and calculated for each lattice point. The display processing unit 13d generates image information formed by superimposing the generated information on layout information indicating a positional relationship between the aggressor element and the moved victim element V1. The display processing unit 13d displays the image information on the display 12 (S17).

As described above, the circuit design support apparatus of the embodiment specifies an aggressor element that generates negative potential lower than ground potential. It also specifies a current flowing from a substrate to an electrode of the aggressor element and also a criterion of a current flowing from a victim element to the substrate. The circuit design support apparatus calculates a current flowing from the victim element to the substrate under a condition where the victim element has been moved to a predetermined area on a circuit chip. The circuit design support apparatus calculates a criterion violation rate, which is represented by a percentage of a difference between the criterion specified for the victim element and the current flowing from the victim element to the substrate in relation to the criterion. The circuit design support apparatus displays information indicating a level of the criterion violation rate by shading, etc., in a way that the information is superimposed on a layout showing a positional relationship between the aggressor element and the victim element. Thereby, a circuit designer can visually identify a destination of an element, which is effective in preventing malfunction due to a parasitic element generated between elements, and thus can efficiently optimize the arrangement of the elements.

Accordingly, it is unnecessary to perform a circuit simulation every time a layout of the elements is changed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A circuit design support apparatus comprising:
   a first specifying unit that specifies at least one first element by a circuit simulation, the first element being arranged on a substrate and being configured to generate negative potential lower than ground potential;
   a second specifying unit that specifies, by a circuit simulation, an amount of current of a noise current source that prevents at least one second element from meeting signal specifications, the second element being arranged in a peripheral area of the first element on the substrate, the amount of current of the noise current source being specified as a criterion of a current flowing from an electrode of the second element to the substrate due to a parasitic element formed between the first element and the second element, and the noise current source being connected to the electrode of the second element;
   a calculation unit that
      under a condition where a location of the second element has been shifted to one of a plurality of places, calculates a second element current flowing to the substrate from the electrode of the second element whose location has been shifted, and
      calculates a criterion violation rate for each of the plurality of places, the criterion violation rate being represented by a percentage of a difference between the criterion specified for the second element whose location has been shifted and the calculated second element current in relation to the criterion; and
   a display processing unit that displays, on a display, information indicating the calculated criterion violation rate such that the information is superimposed on a layout showing a positional relationship between the first element and the second element whose location has been shifted.

2. The circuit design support apparatus according to claim 1, wherein:
   the first specifying unit further specifies, by a circuit simulation, a first element current, which is a current flowing from the substrate to an electrode of the first element; and
   the calculation unit
      calculates a current amplification factor due to a parasitic element formed between the second element whose location has been shifted and the first element arranged in a peripheral area of the second element, based on a dimension between the second element whose location has been shifted and the first element arranged in the peripheral area of the second element, and
      calculates the second element current flowing to the substrate from the electrode of the second element whose location has been shifted, based on the first element current specified as the current flowing from the substrate to the electrode of the first element arranged in the peripheral area of the second element and on the calculated current amplification factor due to the parasitic element formed between the first element and the second element whose location has been shifted.

3. The circuit design support apparatus according to claim 2, wherein:
   the first element arranged in the peripheral area of the second element is more than one; and
   the calculation unit
      calculates the current amplification factor for each of the more than one first element,
      calculates current values after amplification for the more than one first element, each of the current values after amplification being obtained by multiplying the first element current by the calculated current amplification factor, the first element current being the current specified as the current flowing from the substrate to the electrode of the first element arranged in the peripheral area of the second element, and the calculated current amplification factor being the current amplification factor due to the parasitic element formed between the first element and the second element whose location has been shifted, and
      calculates the second element current flowing to the substrate from the electrode of the second element whose location has been shifted, by totalizing the calculated current values after amplification.

4. The circuit design support apparatus according to claim 1, wherein:
   the parasitic element is an npn-type parasitic bipolar transistor;
   the first element current is an emitter current of the parasitic bipolar transistor; and
   the second element current is a collector current of the parasitic bipolar transistor.

5. The circuit design support apparatus according to claim 2, wherein:
   the parasitic element is an npn-type parasitic bipolar transistor;
   the first element current is an emitter current of the parasitic bipolar transistor; and
   the second element current is a collector current of the parasitic bipolar transistor.

6. The circuit design support apparatus according to claim 3, wherein:

the parasitic element is an npn-type parasitic bipolar transistor;

the first element current is an emitter current of the parasitic bipolar transistor; and the second element current is a collector current of the parasitic bipolar transistor.

7. A circuit design support method implemented by a computer, the method comprising:

specifying at least one first element by a circuit simulation, the first element being arranged on a substrate and being configured to generate negative potential lower than ground potential;

specifying, by a circuit simulation, an amount of current of a noise current source that prevents at least one second element from meeting signal specifications, the second element being arranged in a peripheral area of the first element on the substrate, the amount of current of the noise current source being specified as a criterion of a current flowing from an electrode of the second element to the substrate due to a parasitic element formed between the first element and the second element, and the noise current source being connected to the electrode of the second element;

under a condition where a location of the second element has been shifted to one of a plurality of places, calculating a second element current flowing to the substrate from the electrode of the second element whose location has been shifted;

calculating a criterion violation rate for each of the plurality of places, the criterion violation rate being represented by a percentage of a difference between the criterion specified for the second element whose location has been shifted and the calculated second element current in relation to the criterion; and displaying, on a display, information indicating the calculated criterion violation rate such that the information is superimposed on a layout showing a positional relationship between the first element and the second element whose location has been shifted.

8. The circuit design support method according to claim 7, comprising:

specifying, by a circuit simulation, a first element current which flows from the substrate to an electrode of the first element;

calculating a current amplification factor due to a parasitic element formed between the second element whose location has been shifted and the first element arranged in a peripheral area of the second element, based on a dimension between the second element whose location has been shifted and the first element arranged in the peripheral area of the second element; and calculating the second element current flowing to the substrate from the electrode of the second element whose location has been shifted, based on the first element current specified as a current flowing from the substrate to the electrode of the first element arranged in the peripheral area of the second element and on the calculated current amplification factor due to the parasitic element formed between the first element and the second element whose location has been shifted.

9. The circuit design support method according to claim 7, wherein:

the first element arranged in the peripheral area of the second element is more than one; and the method comprises calculating the current amplification factor for the first element, calculating current values after amplification for the more than one first element, each of the current values after amplification being obtained by multiplying the first element current by the calculated current amplification factor, the first element current being the current specified as the current flowing from the substrate to the electrode of the first element arranged in the peripheral area of the second element, and the calculated current amplification factor being the current amplification factor due to the parasitic element formed between the first element and the second element whose location has been shifted, and calculating the second element current flowing to the substrate from the electrode of the second element whose location has been shifted, by totalizing the calculated current values after amplification.

10. The circuit design support method according to claim 7, wherein:

the parasitic element is an npn-type parasitic bipolar transistor;

the first element current is an emitter current of the parasitic bipolar transistor; and the second element current is a collector current of the parasitic bipolar transistor.

* * * * *